United States Patent
Geddes

(10) Patent No.: US 7,207,480 B1
(45) Date of Patent: Apr. 24, 2007

(54) CERTIFIED DIGITAL PHOTO AUTHENTICATION SYSTEM

(75) Inventor: Martin Geddes, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 79 days.

(21) Appl. No.: 10/932,994

(22) Filed: Sep. 2, 2004

(51) Int. Cl.
*G06K 5/00* (2006.01)

(52) U.S. Cl. ............ 235/380; 235/379; 235/382; 235/385; 713/186

(58) Field of Classification Search ........... 235/380; 902/2, 22; 713/186
See application file for complete search history.

(56) References Cited

U.S. PATENT DOCUMENTS

| | | | |
|---|---|---|---|
| 5,623,552 A * | 4/1997 | Lane | 382/124 |
| 6,202,055 B1 * | 3/2001 | Houvener et al. | 705/44 |
| 7,007,243 B2 * | 2/2006 | Baldino | 715/853 |
| 2002/0023027 A1 * | 2/2002 | Simonds | 705/26 |
| 2004/0129778 A1 * | 7/2004 | Ota et al. | 235/381 |
| 2004/0260955 A1 * | 12/2004 | Mantyla | 713/202 |
| 2006/0174134 A1 * | 8/2006 | Taylor | 713/186 |

FOREIGN PATENT DOCUMENTS

| | | | |
|---|---|---|---|
| EP | 0987660 A1 * | 3/2000 | |
| WO | WO 01/008055 A1 * | 1/2001 | |

* cited by examiner

*Primary Examiner*—Seung Ho Lee

(57) ABSTRACT

A system is described for providing certified digital photos as a form of photo identification. In an m-wallet transaction, a vendor requests photo identification from the user of a mobile station, such as a mobile telephone or smart card. In response to the request, the mobile station displays a digital image of an authorized user of the mobile station. The mobile station also displays a trust-certification indicator to indicate to the vendor that the image is authentic. The mobile station may retrieve the image of the authorized user, together with a trust-certification, from a service provider.

23 Claims, 4 Drawing Sheets

CERTIFIED DIGITAL PHOTO AUTHENTICATION SYSTEM

BACKGROUND

The present invention relates to commerce, and more particularly to authentication of a purchaser at a point of sale.

In a transaction in which a user charges payment to an account rather than paying cash, the merchant may seek to authenticate the user's identity before allowing the transaction to proceed. One way to do this is for the user to show a government-issued picture ID, such as a driver's license. In credit card transactions, another way is to have a photo of the user permanently embedded in the user's credit card, so the user shows the photo when the user presents the credit card for payment. The merchant can look at a government-issued ID or at a photo embedded in the user's credit card, and, by comparing the image with the appearance of the user, the merchant can know with a fair amount of certainty that the user is who the user says he is.

Authenticating a user may also be beneficial in an "m-wallet" (mobile wallet) transaction. In an m-wallet transaction, a user presents a properly equipped wireless handheld device, such as a Bluetooth-enabled mobile telephone, as a form of payment for goods or services. Typically, a merchant system will communicate wirelessly with the handheld device, to acquire payment information, such as a credit card or checking account number. To a merchant, however, it may be difficult to determine whether the user of the handheld device is an authorized user or an unauthorized user (such as a thief). This poses a risk to the authorized user of unauthorized charges on his account, and further poses the risk to the vendor that the authorized user will later repudiate unauthorized transactions and request charges to be refunded.

SUMMARY

A digital photo authentication system allows digital photos be used as a form of photo identification on a mobile station, such as a mobile telephone. The system may be employed, for example, in an m-wallet transaction in which the user of a mobile station wishes to pay a vendor for goods or services. In the m-wallet transaction, a vendor requests photo identification from the user of the mobile station, such as a mobile telephone or smart card. In response to the request, the mobile station displays a digital image of an authorized user of the mobile station. The mobile station also displays a trust-certification indicator to indicate to the vendor that the image is authentic.

The mobile station may retrieve the image of the authorized user, together with a trust-certification of the image, from a service provider. In such a case, the mobile station can check the validity of the trust certification and display a trust-certification indicator, such as an LED, only if the trust certification is valid.

DETAILED DESCRIPTION

I. Overview of One Embodiment

Figure 1:
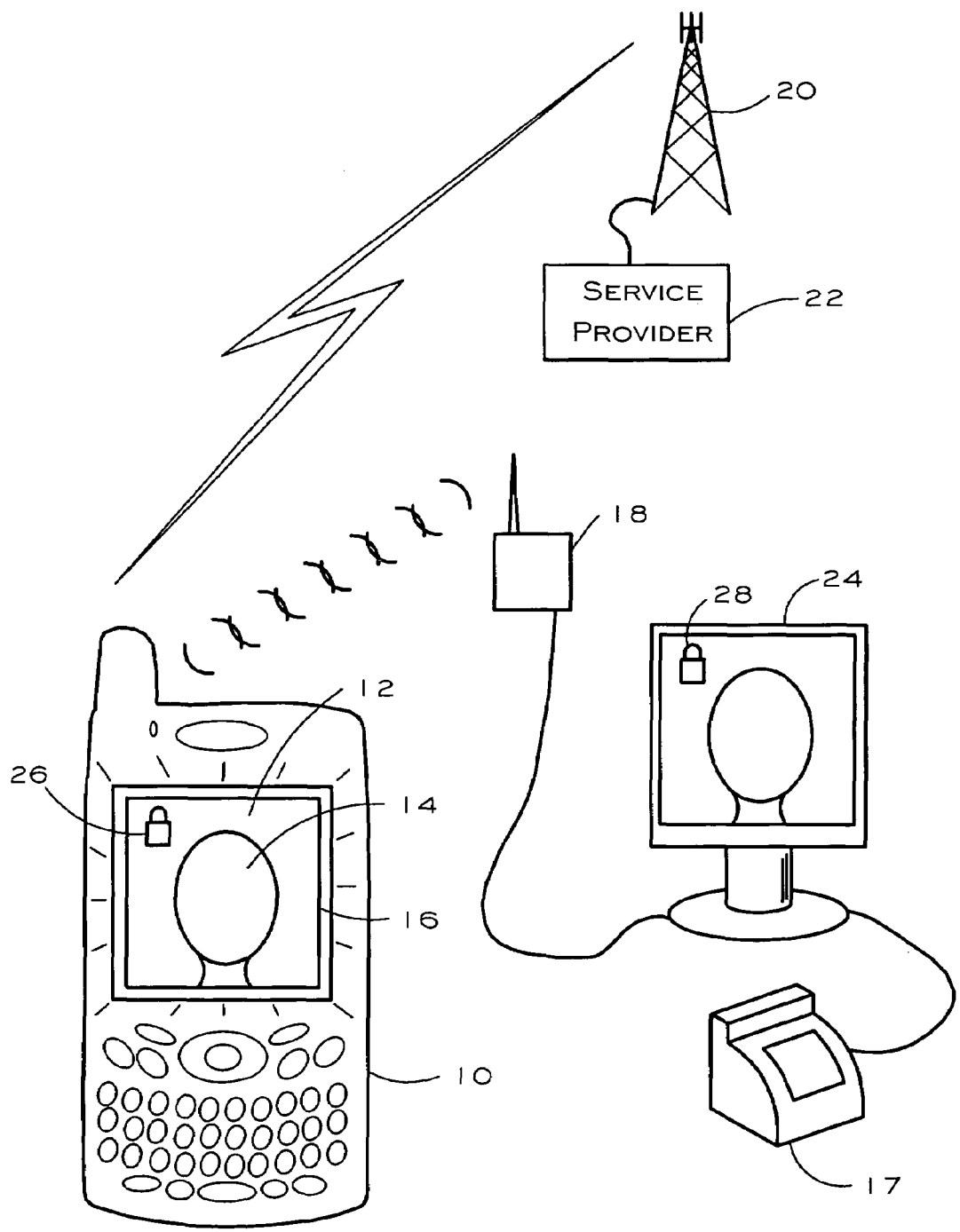
FIG. 1 is a schematic diagram of a digital photo authentication system used in a point-of-sale transaction.

In one embodiment of a digital photo authentication system, illustrated in FIG. 1, a user is provided with a mobile station 10. The mobile station may be, for example, a mobile telephone. The mobile station includes a display screen 12 capable of displaying a digital image 14 of the user. The mobile station also includes a trust-certification indicator, such as an LED (light emitting diode) 16.

In a point-of-sale transaction, a vendor 17 may request the user to provide a form of identification. As an alternative to, for example, a government-issued photo ID, the user can present his or her mobile station 10 as a form of identification. To do so, the user enters into the mobile station a request for photo authentication. In response to the request, the mobile station displays a previously-stored image of the user on its display screen 12, and it activates the trust-certification indicator 16. The vendor visually compares the user presenting the mobile station with the image on the display screen with to determine whether there is a match. The vendor also verifies the presence of the trust-certification indicator 16 to ensure that the image is authentic. If the image is authentic, and if the image matches the user, the vendor proceeds with the transaction. Otherwise, the transaction is denied.

The vendor can use digital photo authentication as a replacement for authentication by physical signature, thus eliminating the transaction costs of collecting and storing physical signatures on paper or by touch screen.

In different embodiments, various techniques may be used to trigger the display of the digital image or to authenticate the image, and additional features may be added. These various embodiments are described in further detail below.

II. Features of a Digital Photo Authentication System

A. Triggering the Photo Display

A mobile station may be triggered to display an image of the authorized user in one or more of a variety of ways. For example, the user may manually enter a request to display the image into the mobile station. The request can be entered by, for example, a button or a menu selection.

In another embodiment, the mobile station may wirelessly receive a request the display the image. The wireless request can be sent directly from a wireless interface 18 of a point-of-sale vendor over a short-range communications protocol, such as Bluetooth, IEEE 802.11, or infrared (IR) communications. Alternatively, the wireless request can be sent to the mobile station over a telecommunications network or by other means. For example, the vendor may send a short message service (SMS) message or a session initiation protocol (SIP) message to the mobile station over a wireless telecommunications network (illustrated schematically be antenna 20) to request the image to be displayed. Alternatively, the request for display of the image may be triggered by other means, such as by proximity of an m-wallet enabled mobile station to a vendor terminal.

In an embodiment in which the vendor terminal sends a wireless request for a digital image, the vendor's request may be triggered in a variety of ways. For example, the vendor may scan a bar code on a "loyalty" or "discount" card of the user. This scan may trigger a request for a digital image of the user. The vendor terminal may be triggered to request a digital image in other ways, such as by proximity of an m-wallet device, or by a keyed-in request by a cashier.

In an embodiment in which the mobile station wirelessly receives a request to display the image, the user may be given the option to accept or to deny the display of the image. For example, in one such embodiment, the mobile station 10 displays the text "Your photo ID has been requested. Display photo?" The mobile station then allows the user to select whether to permit the photo to be displayed. In an additional feature, the message may identify the entity requesting the identification, thereby providing some measure of security to the user against dealing with dishonest vendors.

B. Displaying the Digital Image

Before it is displayed on a mobile station, the digital image may be stored in one or more of a variety of locations. In one embodiment, the digital image is stored on the mobile station itself. In its stored format, the digital image may be encrypted, signed, or otherwise secured to avoid tampering. If the mobile station is capable of running downloadable applications, such as games, Web browsers, and the like, the image is preferably stored in a portion of memory in the mobile station to which such applications are not provided with write access.

In another embodiment, the digital image is stored by a service provider 22 at a location remote from the mobile station. The service provider may be, for example, a wireless telecommunications service provider. In this instance, the user may have his or her picture taken when he or she purchases the mobile station.

The digital image may be displayed in one or more of a variety of locations. In one embodiment, the digital image is displayed on a display screen 12 of the mobile station. For example, mobile telephones are typically provided with a color LCD (liquid crystal display) display screen. Where the authentication system is embodied in such a phone, the digital image may be shown on that display.

In another embodiment, the digital image is wirelessly sent to the point-of-sale vendor to be displayed on a vendor computer system. For example, the mobile station may send the digital image wirelessly to the vendor computer system for display on a display screen 24 of the vendor computer system.

C. Certifying the Authenticity of the Digital Image

It is important for a vendor in a point-of-sale transaction to be assured that the digital image being displayed by the authentication system is actually a picture of the authorized user. For that reason, the authentication system uses one or more techniques to determine whether the image is authentic and to provide a trust-certification so that the vendor can be assured that the image is authentic. While varying levels of authentication may be employed in different embodiments, it is preferable for the authentication method to be sufficiently quick and unobtrusive to offer a convenient alternative to In one embodiment, the mobile station is provided with an indicator, such as an LED 16, that is activated when the mobile station is displaying a certified image of the user. The LED may, for example, frame the display screen of the mobile station. In this embodiment, when the mobile station is displaying a certified image, the LED is illuminated, and the certified image of the user is displayed within an illuminated frame. In a related embodiment, the trust-certification indicator is an icon 26 displayed on the display screen together with the certified image. The icon may be, for example, a "padlock" icon such as those that appear on Web browsers to indicate that the browser is communicating through a secure session.

As a further check on the authenticity of the digital image, the vendor may wish to know whether the mobile station on which the image appears has not been tampered with. That is, the vendor may wish to ensure that the mobile station presented by the user has not been altered to display a trust-certification indicator together with a falsified image. To authenticate the mobile station, the vendor may wirelessly send a challenge message to the mobile station and check for a valid response from the mobile station. For example, the vendor computer system may send an encrypted message to the mobile station. The encrypted message may be, for example, simply a four-digit number. The mobile station then decrypts the message. In one implementation of this embodiment, the mobile station displays the decrypted message on its display screen together with the digital image of the user. In another implementation, the mobile station sends a decrypted version of the message to the vendor computer system. The vendor computer system can then verify whether the message has been properly decrypted. Such a challenge-response protocol is preferably sufficiently complex to reduce the likelihood that it could be accomplished by a fraudulent mobile station.

In anther embodiment, the trust-certification is a digital certificate. For example the digital certificate may include a copy of the digital image—or of a hash value or checksum of the digital image—that is encrypted by a public key of a service provider. In one implementation of this embodiment, the mobile station checks the digital certificate for authenticity and provides an indication of trust-certification (such as by illuminating an LED, as described above) if the certificate authenticates the image. In another implementation of this embodiment, the mobile station wirelessly sends the digital certificate to the vendor computer system together with the image. The vendor computer system can then determine whether the certificate authenticates the digital image. A trust-certification indicator, such as an icon 28, is displayed on the display screen 24 of the vendor computer system.

The trust-certification may be provided to the vendor computer system in the form of a digital watermark embedded within the digital image.

D. Additional Certification Features

The use of a trust-certified digital image may provide various advantages over a printed, government-issued ID. For example, the authentication system may allow repudiation of the identification in case the mobile station is lost or stolen. The rightful owner of the mobile station may report a theft to a service provider. The service provider may then send a message wirelessly to the mobile station requesting that the image be deleted from the mobile station (if it is stored on the mobile station), or that the mobile station otherwise be disabled from operating as an authentication system. Alternatively, if the image is stored by the service provider, the service provider may decline any request by the mobile station to provide the digital image.

As a further assurance for vendors, the service provider may offer to indemnify vendors against fraudulent transactions. In this embodiment, the mobile station may display an indemnification amount together with the digital image. The displayed indemnification amount could be equal to or less than the total amount of the contemplated transaction. If the owner of the mobile station later attempts to repudiate the transaction (claiming, for example, that user of the mobile station was unauthorized), the service provider will pay the indemnification amount to the vendor.

The indemnification amount may vary according to circumstances. For example, in the case of a trusted vendor, who completes many successful transactions through the service provider, the indemnification amount may be the full amount of the transaction. In the case of a vendor who has not established a record of trust with the service provider, the indemnification amount may be correspondingly reduced from the full amount of the transaction.

Before a vendor is entitled to receive the indemnification amount from the service provider, the service provider may require the vendor to verify that the vendor made an attempt to authenticate the user using the trust-certified digital image. To make that verification, the mobile station may display an identifying code, such as a four-digit number, together with the trust-certified image of the user. The vendor then makes a record of that code, for example, by entering that code into the vendor computer system. If the vendor seeks indemnification for a repudiated transaction, the vendor can provide the identifying code as evidence that efforts were made to authenticate the user's identification. The vendor may also be required to make a record of the indemnification amount. The indemnification amount may itself be variable (by a few cents, for example) to serve as an additional check that the vendor reviewed the digital image of the user on the mobile station.

III. A Digital Photo Authentication Method

A method of operating a digital photo authentication system may be implemented in a variety of ways, with various features as described in section II, above. Two exemplary embodiments of this method are described below. In the first embodiment, illustrated in FIG. 2, the digital image of the user is stored on the mobile station and is displayed at the vendor computer system. In the second embodiment, as illustrated in FIG. 3, the digital image of the user is stored by a service provider and displayed on the mobile station.

Figure 2:
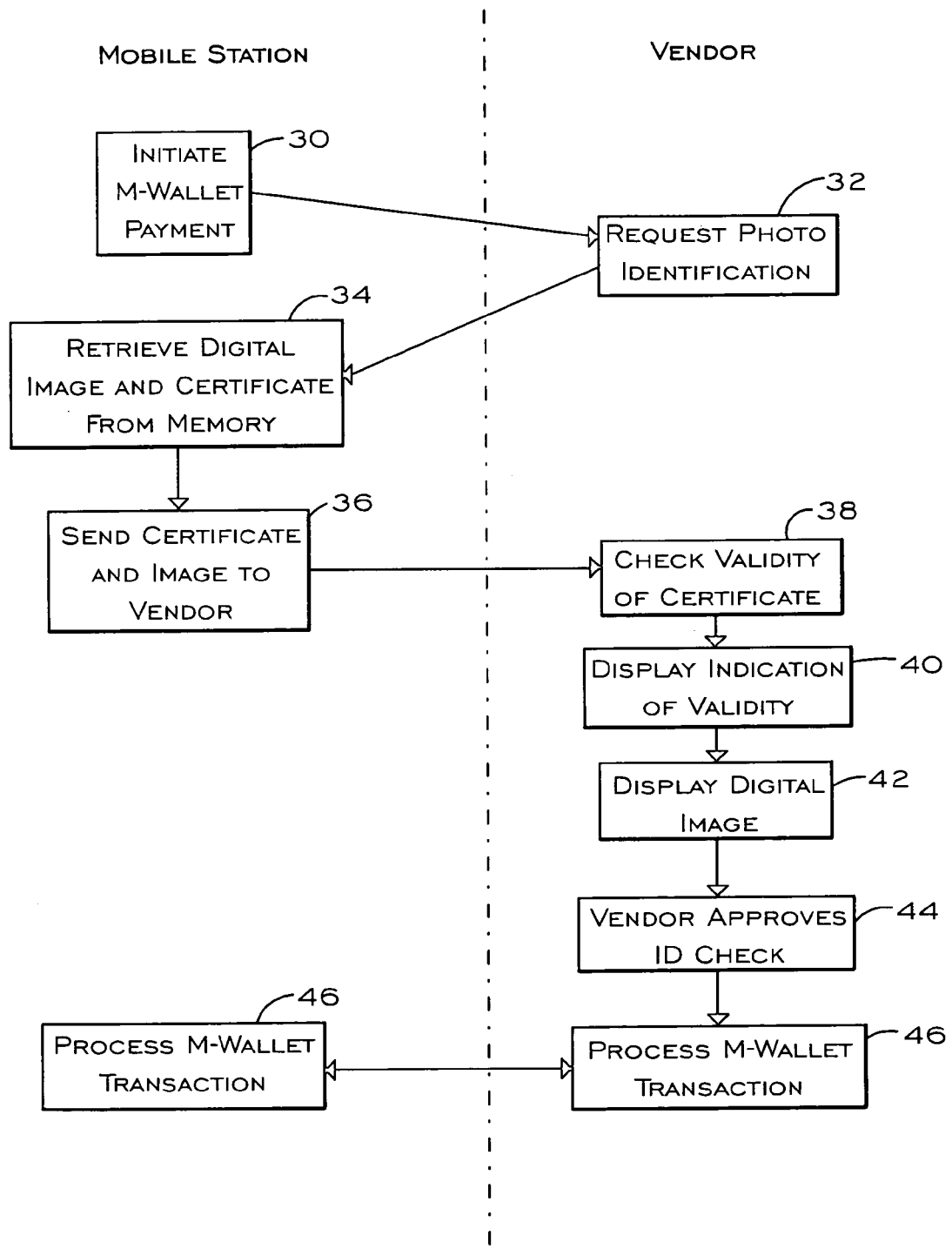
FIG. 2 is a flow diagram of one embodiment of a digital photo authentication method.

In the exemplary method of FIG. 2, the mobile station detects a request to initiate an m-wallet payment at step 30. The request may come, for example, in the form of a wireless request for payment information from the vendor or from information entered by the user at the mobile station. The request to initiate an m-wallet payment may include an authorization by the user of the mobile station to provide payment information to the vendor. At step 32, the vendor computer system requests photo authentication of the user. In response to the request for photo authentication, the mobile station retrieves the digital image of the authorized user and a corresponding trust-certification from memory in step 34. The trust-certification may be, as described above in section II, a digital certificate. As an alternative to retrieving the certificate from memory, the mobile station may generate the certificate at the time the image is retrieved.

In step 36, the mobile station sends the digital image and the digital certificate to the vendor computer system. In step 38, the vendor computer system checks the validity of the certificate. To do so, the vendor computer system may verify the certificate with a trusted third-party certificate authority. If the vendor computer system finds the certificate to be valid then it displays a trust-certification indicator (such as the icon 28 of FIG. 1) in step 40. The vendor computer system also displays the digital image of the authorized user in step 42. The vendor may then compare the image displayed by the vendor computer system with the appearance of the user of the mobile station to determine whether the user is authorized. If the vendor approves the user as authorized in step 44, the mobile station and the vendor computer system can process the m-wallet transaction at step 46.

Figure 3:
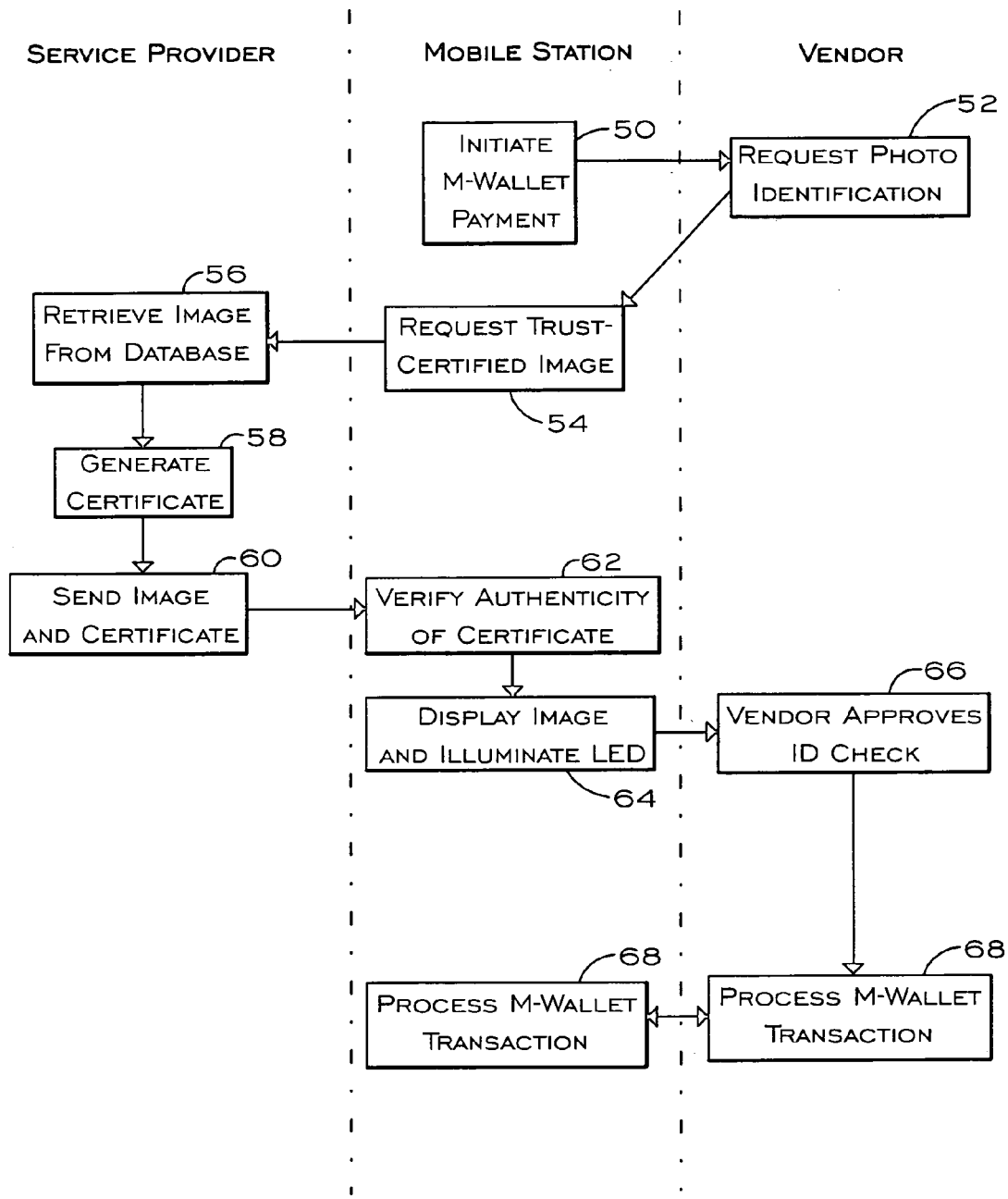
FIG. 3 is a flow diagram of another embodiment of a digital photo authentication method.

An alternative embodiment is illustrated in FIG. 3. In step 50 of this embodiment, the mobile station initiates an m-wallet payment. The vendor requests photo authentication in step 52. In response to the request for photo authentication, the mobile station sends a request for a digital photo to a service provider in step 54. In step 56, the service provider retrieves a digital image of an authorized user, and in step 58, the service provider generates a certificate to certify the authenticity of the image. In step 60, the service provider sends the certificate and the digital image to the mobile station. In step 62, the mobile station verifies the authenticity of the certificate. If it is authentic, the mobile station in step 64 displays the digital image together with a trust-certification indicator, such as the LED 16 or the icon 26 of FIG. 1. The vendor may then make a visual comparison between the digital image displayed on the mobile station and the appearance of the user. If, in step 66, the vendor approves the identification, the m-wallet transaction can proceed in step 68.

Variations on the methods described above may also be implemented in a digital photo authentication system. For example, the display of the digital image of an authorized user may be triggered by the sending of payment information from the mobile station in an m-wallet transaction. Alternatively, the display of the digital image may be triggered when the mobile station has been presented for an m-wallet transaction, or at other times. Moreover, the user of the mobile station may be provided with an option to manually accept or decline a request to display the digital image.

IV. A Digital Photo Authentication System

A mobile station for use in a digital photo authentication system may be implemented in various ways. In one embodiment, the mobile station is a mobile telephone. In another embodiment, the mobile station is a smart card with a short-range radio-frequency interface. One particular embodiment of a mobile station is illustrated in FIG. 4.

Figure 4:
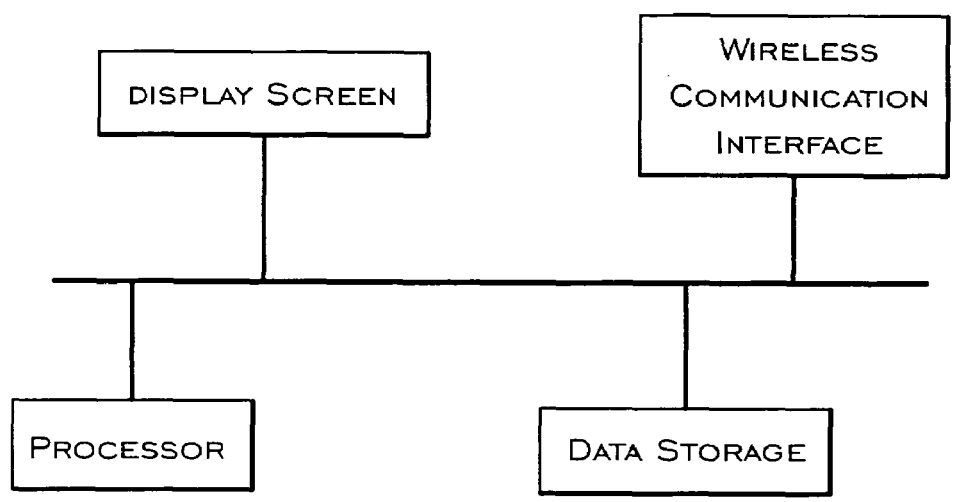
FIG. 4 is a schematic block diagram illustrating the architecture of an exemplary mobile station used in a digital photo authentication system.

In FIG. 4, a mobile station 70 is provided with a processor 72, a wireless communications interface 74, data storage 76, and a display screen 78. The data storage 76 stores program instructions that are executable by the processor 72. The wireless communication interface communicates with a vendor's wireless interface using a short-range wireless communications protocol and/or with a service provider using a wireless telecommunications network, such as a CDMA (code-division multiple access) network. The program instructions direct the mobile station 70 to operate as described above in sections I–III.

The system described herein can be embodied with variations from the examples described above, and the details of those embodiments can be implemented with a variety of techniques. Thus, the embodiments described above should be understood to illuminate rather than limit the scope of the present invention. Features of the various embodiments can be interchanged and combined while keeping within the scope of the invention, as defined by the following claims.

The invention claimed is:

1. A method comprising:
    wirelessly receiving into a mobile station (i) a digital image of a user of the mobile station and (ii) a trust-certification authenticating the digital image; and
    when the mobile station is thereafter being used to engage in an m-wallet transaction, the mobile station presenting as a form of picture-ID (i) the digital image and (ii) an indication of the trust-certification.

2. The method of claim 1, wherein the indication of the trust-certification comprises the trust-certification.

3. The method of claim 1, wherein the indication of trust-certification comprises a watermark in the digital image.

4. The method of claim 1, wherein presenting the indication of the trust-certification comprises:
    wirelessly transmitting to a vendor terminal a signal that causes the vendor terminal to present the indication of trust-certification.

5. The method of claim 1, wherein presenting the digital image and the indication of the trust-certification comprises:
    displaying both the digital image and the indication on a display screen of the mobile station.

6. The method of claim 1, wherein presenting the digital image and the indication of the trust-certification comprises:
    displaying the digital image on a display screen; and
    lighting an LED as the indication of trust-certification.

7. The method of claim 1, further comprising:
    a service provider capturing the digital image and sending the digital image to the mobile station.

8. A method carried out by a mobile station, the method comprising:
    detecting that the mobile station is being presented to a vendor at a point of sale; and
    responsively displaying on a display screen of the mobile station a digital image of a person authorized to use the mobile station wherein said digital image is received wirelessly.

9. The method of claim 8, further comprising:
    displaying, in association with the digital image, a trust-indication.

10. The method of claim 8, further comprising transmitting payment information from the mobile station to the vendor.

11. The method of claim 8, further comprising:
    wirelessly receiving the digital image into the mobile station before the mobile station is presented to the vendor at the point of sale.

12. The method of claim 8, wherein detecting that the mobile station is being presented to the vendor at the point of sale comprises:
    wirelessly receiving into the mobile station a vendor request to provide payment information.

13. The method of claim 8, wherein detecting that the mobile station is being presented to the vendor at the point of sale comprises:
    receiving into the mobile station a user-authorization for the mobile station to convey payment information to the vendor.

14. The method of claim 8, wherein detecting that the mobile station is being presented to the vendor at the point of sale comprises:
    detecting that the mobile station has conveyed payment information to the vendor.

15. A mobile station comprising:
    a wireless communication interface;
    a display screen;
    a processor;
    data storage;
    program instructions stored in the data storage and executable by the processor (i) to detect when the mobile station is being presented to a vendor at a point of sale and (ii) to responsively display on the display screen a digital image of a person authorized to operate the mobile station wherein said digital image is received wirelessly.

16. The mobile station of claim 15, wherein the program instructions are executable by the processor to detect when the mobile station is presented to the vendor at the point of sale by carrying out a process comprising:
    detecting that the mobile station has received a signal from the vendor requesting payment information.

17. The mobile station of claim 15, wherein the program instructions are executable by the processor to detect when the mobile station is presented to the vendor at the point of sale by carrying out a process comprising:
    detecting that the mobile station has received user authorization to provide payment information to the vendor.

18. The mobile station of claim 15, wherein the program instructions are executable by the processor to detect when the mobile station is presented to the vendor at the point of sale by carrying out a process comprising:
    detecting that the mobile station has sent a signal to the vendor providing payment information.

19. The mobile station of claims 15, wherein the program instructions are further executable by the processor to receive the (i) digital image and (ii) a trust-certification authenticating the digital image.

20. The mobile station of claim 19, wherein the program instructions are further executable to present, in conjunction with the digital image, an indication of the trust-certification.

21. The mobile station of claim 20, wherein the indication of the trust-certification comprises the trust-certification.

22. The mobile station of claim 20, wherein the indication of the trust-certification comprises a lighted LED.

23. The mobile station of claim 20, wherein the indication of the trust-certification comprises a watermark in the digital image.

* * * * *